(12) United States Patent
Hartman et al.

(10) Patent No.: US 7,238,927 B1
(45) Date of Patent: Jul. 3, 2007

(54) DETECTION OF THE PHASE AND AMPLITUDE OF ELECTROMAGNETIC WAVES

(75) Inventors: Klaus Hartman, Wilnsdorf (DE); Rudolf Schwarte, Netphen (DE)

(73) Assignee: PMDTechnologies GmbH, Siegen (DE)

( * ) Notice: Subject to any disclaimer, the term of this patent is extended or adjusted under 35 U.S.C. 154(b) by 169 days.

(21) Appl. No.: 10/398,537

(22) PCT Filed: Oct. 9, 2000

(86) PCT No.: PCT/DE00/03549

§ 371 (c)(1),
(2), (4) Date: Jul. 14, 2003

(87) PCT Pub. No.: WO02/31455

PCT Pub. Date: Apr. 18, 2002

(51) Int. Cl.
*G01J 1/42* (2006.01)

(52) U.S. Cl. .............................. 250/208.2; 250/214 R; 250/201.9

(58) Field of Classification Search ............. 250/208.1, 250/208.2, 214 R, 201.9
See application file for complete search history.

(56) References Cited

U.S. PATENT DOCUMENTS 4,939,369 A * 7/1990 Elabd .......................... 250/332
5,598,261 A * 1/1997 Duncan et al. ............. 356/121
5,751,427 A * 5/1998 de Groot ..................... 356/507

FOREIGN PATENT DOCUMENTS

WO    WO 98/10255    9/1997

OTHER PUBLICATIONS

Schwarte et al., "New optical four-quadrant phase detector integrated into a photogate array for small and precise 3D cameras", Mar. 1997, Proceedings of SPIE—vol. 3023 Three-Dimensional Image Capture, pp. 119-128.*

* cited by examiner

*Primary Examiner*—Thanh X. Luu
(74) *Attorney, Agent, or Firm*—Michael L. Dunn

(57) ABSTRACT

The invention relates to a device for detecting electromagnetic waves, especially for also detecting the phase and amplitude of electromagnetic waves, using elements that react sensitively to incident electromagnetic waves. The aim of the invention is to provide a method and a device for detecting the phase and amplitude of electromagnetic waves that are economical as possible and also allow relatively high resolution. To this end, the invention provides that the device has two different pixel types, one pixel type being essentially only sensitive to intensity and the other pixel type being essentially only sensitive to phase. Accordingly, two different pixel types are used in the method, one of which reacts essentially to the intensity of the incoming electromagnetic waves, while the other pixel type is phase-sensitive.

24 Claims, 4 Drawing Sheets

DETECTION OF THE PHASE AND AMPLITUDE OF ELECTROMAGNETIC WAVES

Figure 1A:
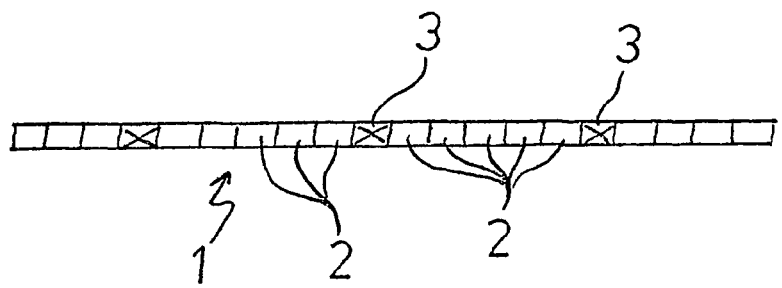

The present invention relates to a device for sensing electromagnetic waves, in particular also the phase and amplitude of electromagnetic waves.

Corresponding devices and methods are, in principle, already known. On the one hand digital image capturing apparatuses have been commercially available for a long time, which are substantially composed of a light-sensitive matrix or a light-sensitive line of individual elements, for example, CCD disks that are electrically charged by the incidence of light, wherein the charges are read pixel by pixel, and represent a measurement for the electromagnetic radiation occurring within a specific illumination time. Furthermore, so-called PMD pixels are also known, that is to say light-sensitive components or pixels that can sense the phase of electromagnetic waves as well as the amplitude thereof. In addition to purely capturing images, they are also suitable for sensing the distance of the object from which the electromagnetic radiation is being emitted.

These PMD elements are, however, relatively expensive and inter alia also need more space than the pixels of conventional CCD or CMOS sensors. With this state of the art in mind, the object of the present invention is to provide a method and a device for sensing the phase and amplitude of electromagnetic waves that are as inexpensive as possible and also enable relatively high resolution.

With respect to the method, this object is solved in that in addition to phase-sensitive pixels that enable distance to be determined, conventional light-sensitive pixels are also used, wherein the substantive image resolution and possibly also the colours are determined by the more simple, conventional pixels, while the additional distance or depth data for all the pixels are obtained from the closest phase-sensitive pixel or pixels.

With respect to the device, the object according to the invention is solved in that a light-sensitive receiving device is provided with at least two different types of receiving elements (pixels), wherein one type of pixel senses the intensity of the electromagnetic radiation, and the other type of pixel senses phase information.

The method and the device according to the present invention advantageously have some further features that will be explained hereinafter, and that can be implemented substantially independently of one another to the extent that they are not directly dependent upon one another.

Clearly, so-called phase-sensitive pixels are not only phase-sensitive, but naturally are also light-sensitive, wherein, however, it is the phase information obtained from these pixels that is relied upon for conversion into suitable image information, while image brightness and spectrum are substantially produced by the signals that are derived from the intensity-sensitive pixels. The phase-sensitive and intensity-sensitive pixels can be arranged together in the same plane or, for example in the case of a so-called line-scanning camera, in a row or line, and they can also be arranged beside or behind one another.

Thus, for example, the phase-sensitive and the intensity-sensitive pixels can be arranged separately from one another on different components (semiconductor chips), in that the incident light is split, for example by means of a beam splitter, and is fed on the one hand onto a component with phase-sensitive pixels, and on the other hand onto a component with intensity-sensitive pixels. The phase information and the intensity information can then be processed and interpreted separately, wherein a unified "3D image" is put together from these data, which contains the phase information, and respectively transit time (corresponding to the spatial depth) as well as the intensity information (corresponding to the local image brightness, possibly spectrally resolved).

In this way the phase-sensitive pixels can also be spatially arranged behind the intensity-sensitive pixels, in particular when they are respectively sensitive to different spectral ranges, wherein the maximum sensitivity of the phase-sensitive pixels can also lie, in particular, outside the visible range. In this way different receiving technologies can be used. The interpreting modules can also be configured differently. When spatially separating phase and intensity-sensitive pixels, care must naturally be taken with the exact spatial and temporal coordinates of the phase and respectively the intensity-sensitive pixels that correspond to one another with respect to the object ranges sensed.

The phase and intensity information sensed independently of one another can also be used alternately for supplementing or improving the respective other information.

Gaps between pixels of one type can either be supplemented or filled in by interpolation or by additional information gained from the respective other type of pixel.

When the phase-sensitive pixels have a different spectral sensitivity to that of the intensity-sensitive pixels, it is also recommended that the beam splitter that is possibly provided performs a corresponding distribution according to the spectrum.

Advantageously, the phase and respectively the transit time information is obtained in that modulated signals, in particular electromagnetic signals, are used, while un-modulated signals can also be used for interpreting the intensity information.

The phase or transit time data are then also assigned to those non-phase-sensitive pixels that are located in the vicinity of the phase-sensitive pixels, wherein the area between two respective adjacent phase-sensitive pixels can also be interpolated. The assignment of intensity-sensitive pixels to phase-sensitive pixels can in this way be established, or can also take place in a variable manner.

In the preferred embodiment, lighting elements are used that emit modulated radiation, and that apply this modulated radiation to a scene to be captured using the different pixels, wherein, as described hereinabove, the additional use of normal lighting or also of natural lighting is also possible at the same time. LEDs, laser diodes or a mixture of the two can be used as a lighting element. These lighting elements should preferably be arranged around a recording optics. They are directed, controlled and monitored by a suitable electronics module.

Further advantages and features will be evident from the following description, with a list of features that can possibly also be features of dependent claims.

Figure 1B:
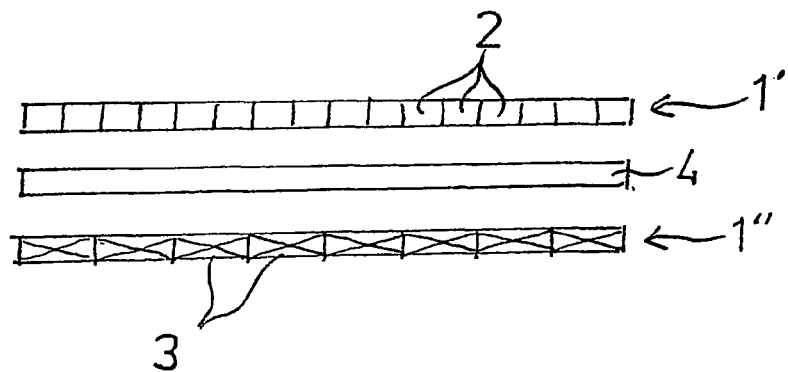
Figure 1C:
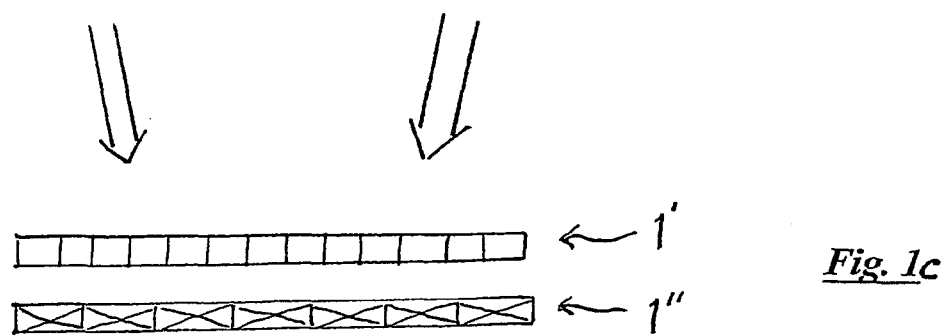
Figure 2:
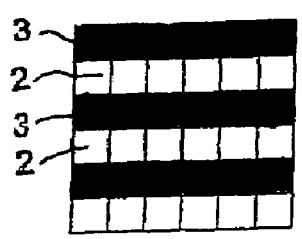
Figure 2A:
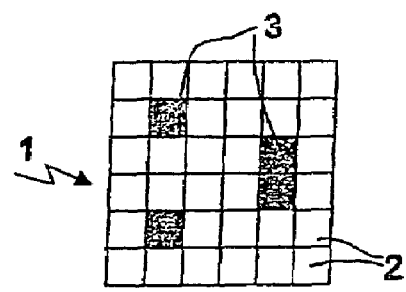
Figure 2B:
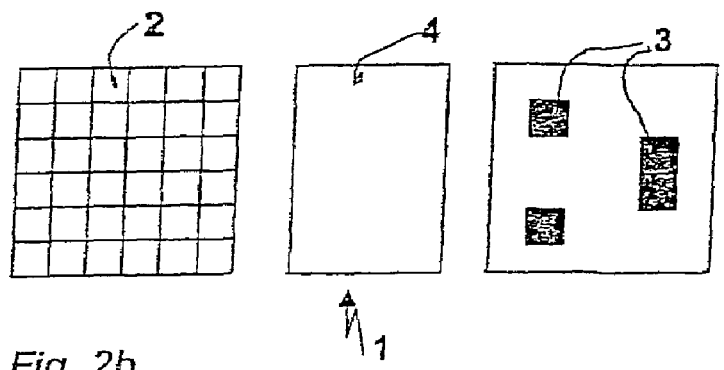
Figure 3:
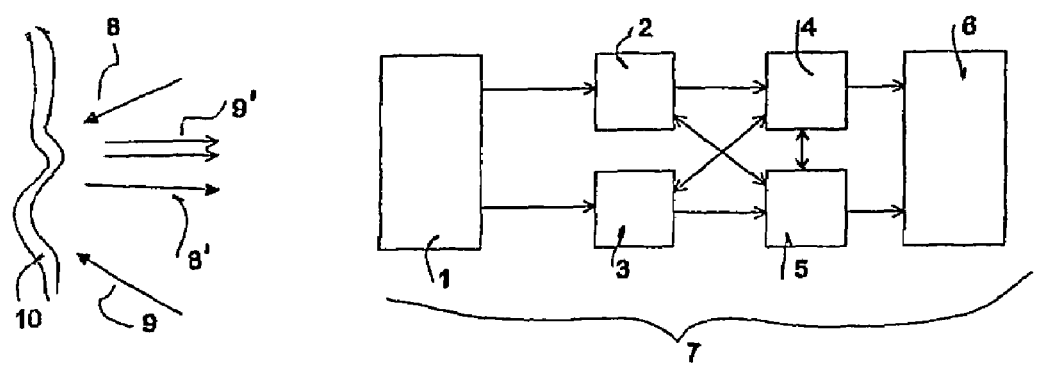
Figure 4:
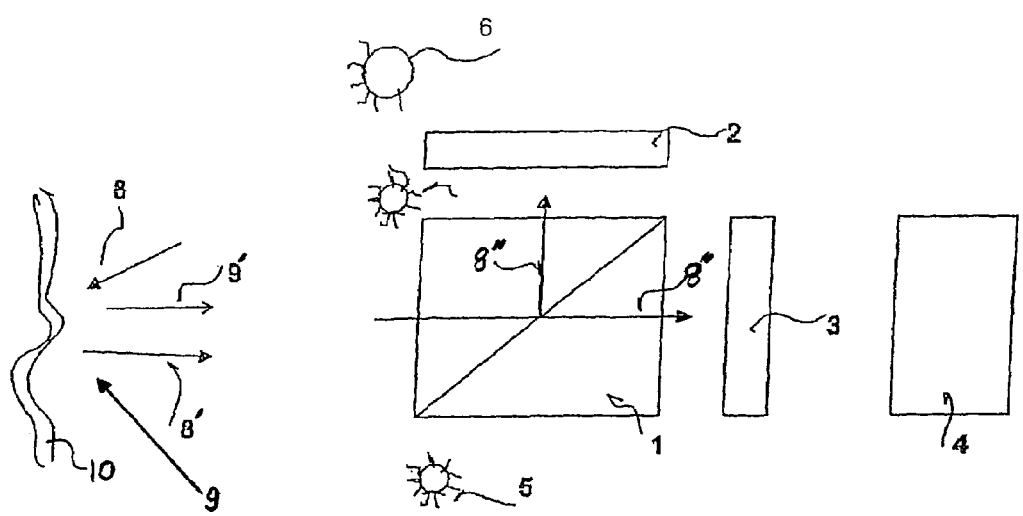

The attached drawings show apparatuses in a schematic manner, which form embodiments of the device according to the invention, and with reference to which the method can also be demonstrated. There is shown, in:

FIG. 1a a line element with different pixels for intensity and phase detection,

FIG. 1b an arrangement of phase-sensitive pixels in the direction of radiation, adjacent to or behind intensity-sensitive pixels, and with a spectral filter or respectively a spectral splitter arranged in-between them, FIG. 1c an arrangement of phase-sensitive pixels in the direction of radiation behind intensity-sensitive pixels, FIG. 2 an arrangement of several lines of pixels, wherein the lines for "identity detection" alternate with lines of "phase detection", FIG. 2a schematically, a surface or respectively a matrix arrangement for two different pixel types, FIG. 2b an arrangement analogous to FIG. 1b, FIG. 3 a schematic representation of the principle of operation of the device according to the invention, and FIG. 4 the combination of two line elements, one of which is intensity-sensitive, and the other phase-sensitive.

FIG. 1 shows the light-sensitive sensor of, for example, a line scanning camera. The sensor 1 is composed of a row of intensity-sensitive pixels 2, which is possibly interrupted by individual phase-sensitive pixels 3. This light-sensitive line, which is also often described as a "line-scanning camera" as it forms the camera element of a line-scanning camera, records pictures of objects using suitable optics and with the aid of a suitable interpreting electronics, wherein scanning of the surface of an object or respectively of the surface areas taken into account in an image, is done perpendicular to the pixel arrangement. The majority of pixels is formed by the intensity-sensitive pixels 2. The phase-sensitive pixels 3, which are also generally somewhat larger than the light-sensitive pixels 2, are inserted only occasionally and where possible at equal distances from one another in the row of pixels 2. In the devices according to the invention, the number of phase-sensitive pixels is generally substantially smaller than the number of simply light-sensitive pixels.

FIG. 1b shows an arrangement of a line-scanning camera with two lines (1', 1"). Line 1' is composed of intensity-sensitive pixels, and line 1" is composed of phase-sensitive pixels. Each line can be defined per se in terms of dimension and number of pixels. For practical applications, the two lines are more advantageously matched to one another with respect to their size. The incident radiation, that contains intensity and phase data, is conducted via a beam splitter (4) onto the two lines. By means of the beam-splitting arrangement, assignment of the respective pixels to lines 1' and 1" can be obtained.

In particular, it is also conceivable to use TFA (thin film on ASIC) image sensors. These thin film image sensors, which are generally intensity and spectrally-sensitive pixels, can be applied to an opto-ASIC with phase-sensitive pixels 1", and the sensor layer 1' thus applied onto these phase-sensitive pixels 1" can remain transparent at those places where the radiation has to be incident upon the phase-sensitive or phase and intensity-sensitive pixels 1".

The individual pixels of the TFA layer can also have different spectral sensitivities, and preferably are combined in groups of three of four pixels of different respective spectral sensitivity.

FIG. 1c shows an arrangement 1' of intensity-sensitive pixels in the direction of radiation (corresponding to the two double arrows) in front of a row or layer 1" of phase-sensitive pixels, wherein the layer 1' is transparent at least to the radiation to which the layer 1" is sensitive. In an analogous manner, the radiation path can also be reversed, when the layer 1" is correspondingly transparent to the radiation that has to be received by the layer 1'.

The light-sensitive sensor shown in FIG. 2a, for example as an array arrangement, has, as a distinguishing feature, integration of different pixels, in particular pixels that preferably can detect phase information (3) and pixels that can preferably detect intensity information (type 2) are integrated onto a semiconductor chip. The radiation (1) that arrives at the receiving module contains both phase and intensity information.

In FIG. 2b, the parallel detection of phase and intensity information is solved in that a module (4) for splitting the incident radiation (1) is employed. In order to detect intensity information, the pixels are placed in an array arrangement on the receiving module 2. The pixels for phase detection (3) are also placed in an array arrangement on the other receiving module.

Assuming that in FIG. 3 the scene (10) is subjected to modulated radiation (8) and also to natural radiation (9), and back-scattering (9',8') occurs from there, a possible method of interpretation is represented that can be implemented as a compact overall module (7).

A beam splitter (1) that, for example, can also perform spectral separation, assigns portions of the back-scattered radiation (light) to the respective receiving modules (2, 3). The receiving unit 2 forms a light-sensitive sensor that is preferably provided with at least one intensity-sensitive pixel. On the other hand, the light-sensitive sensor 3 is provided with at least one phase-sensitive pixel, with which a phase or respectively a transit time can be determined. The scene imaging and respectively assignment to the receiving modules and the respective pixels is specifically defined in a fixed or a variable manner.

The module 4 preferably processes data from the receiving module 2. In order to improve the interpretation, data supplied by the receiving module 3 and from the processing module 5 assigned to 3 can be taken into account. The advantage of defined assignment of the different pixels to the two receiving modules and the synchronous sensing of intensity information and phase or respectively transit time information is predominant.

The module 5 processes information from the receiving module 3. Here also, data from the modules 2 and 4 can be taken into account for improving interpretation.

The parallel processing of the individual data with access to raw data and the processed data, combination of the individual data in the sense of data fusion and the supplying of the different data at an interface, is implemented by the module 6.

FIG. 4 shows an arrangement with a beam splitter (1) that can equally be selected to be in a filter arrangement. With reference to the description of FIG. 3, the incident radiation is diverted by the beam splitter (1) onto at least two receiving units (2, 3). The receiver 2 is defined as a 2D pixel arrangement with at least one pixel for sensing and interpreting intensity information. The receiver 3 is designed as a 3D pixel arrangement with at least one pixel preferably for phase/transit time sensing/measuring.

The pixels of the receiver (2, 3) are assigned to one another in a defined manner such that an imaged scene point (scene voxel) can be assigned to the respective pixels on 2 and 3.

The lighting modules (5) emit modulated light or steady light that is applied to the scene (10). The radiation (8') scattered from there arrives via the beam splitter (1) in the form of split beams 8" at the receiving modules (2,3). The radiation of an external lighting (6) that also emits modulated or un-modulated light, or natural ambient light (9) can be provided as the ambient light.

The lighting 5 that is assigned to the receiving module can, for example, be arranged around the optics, wherein direction and possibly supply of a controlled variable is provided by the interpreting module (4). The lighting modules (5) can, for example, be implemented with one or more laser diodes/LEDs or a combination of the two.

The interpreting module (4) processes the signals from 2 and 3 and forms an interface in order to supply the data.

The invention claimed is:

1. A method for sensing image information with the aid of light-sensitive receiving pixels comprising sensing an intensity of electromagnetic waves radiated from an object using a first structural type of non-PMD pixels that are intensity-sensitive and sensing distance of an object using a second structural type of pixels that are phase sensitive PMD pixels sensitive to phase of electromagnetic waves radiated from the object.

2. A method according to claim 1, wherein the two different types of pixels are arranged in a same plane or row of pixels.

3. A method according to claim 1, wherein the phase-sensitive PMD pixels are arranged behind the intensity-sensitive pixels with respect to direction of electromagnetic waves emitted from the object.

4. A method according to claim 1, wherein the phase-sensitive pixels and the intensity-sensitive pixels are arranged spatially separated from one another, and radiation from the object is split by a beam splitter into separate portions, wherein the portions are conducted separately onto the first and second types of pixels.

5. A method according to claim 3, wherein a clear, spatial assignment of individual phase-sensitive pixels to intensity-sensitive pixels or groups of intensity-sensitive pixels is performed.

6. A method according to claim 4 wherein the beam splitter is a spectral beam splitter, by means of which radiation from the object is split into at least two different spectral portions.

7. A method according to claim 1 wherein the first and second types of pixels are contained within an image sensor and electromagnetic radiation from the object contains reflective portions that are due to irradiation with a modulated light source.

8. A method according to claim 2, wherein the intensity and phase sensitive pixels are contained within an image sensor and electromagnetic radiation received by the image sensor contains reflective portions that are due to irradiation with a modulated light source.

9. A method according to claim 3, wherein the intensity and phase sensitive pixels are contained within an image sensor and electromagnetic radiation received by the image sensor contains reflective portions that are due to irradiation with a modulated light source.

10. A method according to claim 4, wherein the intensity and phase sensitive pixels are contained within an image sensor and electromagnetic radiation received by the image sensor contains reflective portions that are due to irradiation with a modulated light source.

11. A method according to claim 5, wherein the intensity and phase sensitive pixels are contained within an image sensor and electromagnetic radiation received by the image sensor contains reflective portions that are due to irradiation with a modulated light source.

12. A device for sensing electromagnetic waves with the aid of elements comprising pixels that react to incident electromagnetic waves, wherein the device is provided with two different structural types of pixels, one pixel type of which area non-PMD intensity-sensitive pixels, and the other pixel type are phase-sensitive PMD pixels for sensing the distance of an object from which the electromagnetic waves are being emitted.

13. A method according to claim 12, wherein the phase-sensitive type of pixels are sensitive to phase of intensity modulation of incident electromagnetic waves.

14. A device according to claim 12, wherein the different pixel types are arranged in a same plane or row of pixels.

15. A device according to claim 12, wherein the phase-sensitive pixels are arranged behind the intensity-sensitive pixels, wherein the intensity-sensitive pixels are transparent to at least one wavelength that can be detected with respect to phase and intensity by the phase-sensitive pixels.

16. A device according to claim 12, wherein the phase-sensitive and intensity-sensitive pixels are arranged spatially separated from one another, wherein electromagnetic radiation in the form of light to be received by the pixels is split by a beam splitter into separate portions and the portions are conducted separately onto the phase-sensitive and intensity-sensitive pixels.

17. A device according to claim 16, wherein the beam splitter has the properties of an optical imaging system, and wherein the phase-sensitive pixels can clearly be assigned to corresponding intensity-sensitive pixels that respectively receive light portions split by the beam splitter from light that impinges from the same place and from the same direction onto the beam splitter.

18. A device according to claim 12, wherein a modulatable lighting apparatus is provided that emits light in a spectral range that can be detected by the phase-sensitive pixels.

19. A device according to claim 14, wherein a modulatable lighting apparatus is provided for illuminating the object which lighting apparatus emits electromagnetic radiation in the form of light in a spectral range that can be detected by the phase-sensitive pixels.

20. A device according to claim 15, wherein a modulatable lighting apparatus is provided for illuminating the object which lighting apparatus emits electromagnetic radiation in the form of light in a spectral range that can be detected by the phase-sensitive pixels.

21. A device according to claim 16, wherein a modulatable lighting apparatus is provided for illuminating the object which lighting apparatus emits electromagnetic radiation in the form of light in a spectral range that can be detected by the phase-sensitive pixels.

22. A device according to claim 18, wherein a modulatable lighting apparatus is provided for illuminating the object which lighting apparatus emits electromagnetic radiation in the form of light in a spectral range that can be detected by the phase-sensitive pixels.

23. A method for sensing information with the aid of light-sensitive receiving pixels, wherein two structurally different types of pixels are used, one of which are non-PMD pixels that reacts to an intensity of irradiated electromagnetic waves, while the other type of pixels are a phase-sensitive PMD pixels wherein the phase-sensitive pixels and the intensity-sensitive pixels are arranged spatially separated from one another, and incident electromagnetic radiation in the form of light to the pixels is split by a beam splitter into separate portions, wherein the portions are conducted separately onto the phase-sensitive and the intensity-sensitive pixels.

24. A device for sensing electromagnetic waves with the aid of elements comprising pixels that react to incident electromagnetic waves, wherein the device is provided with two structurally different types of pixels, one pixel type of which are non-PMD intensity-sensitive pixels, and the other pixels are phase-sensitive PMD pixels wherein the phase-sensitive and intensity-sensitive pixels are arranged spatially separated from one another, wherein electromagnetic waves in the form of light to be received by the pixels is split by a beam splitter and conducted separately onto the phase-sensitive and intensity-sensitive pixels.

* * * * *